United States Patent
Eschig et al.

(10) Patent No.: US 12,054,574 B2
(45) Date of Patent: Aug. 6, 2024

(54) FUNCTIONALIZED POLYMERS

(71) Applicant: FRAUNHOFER-GESELLSCHAFT ZUR FÖRDERUNG DER ANGEWANDTEN FORSCHUNG E.V., Munich (DE)

(72) Inventors: Steven Eschig, Braunschweig (DE); Stefan Friebel, Evessen (DE); Philipp Schmidt, Braunschweig (DE)

(73) Assignee: Fraunhofer-Gesellschaft Zur Förderung Der Angewandten Forschung E.V., Munich (DE)

( * ) Notice: Subject to any disclaimer, the term of this patent is extended or adjusted under 35 U.S.C. 154(b) by 644 days.

(21) Appl. No.: 17/259,402

(22) PCT Filed: Jul. 10, 2019

(86) PCT No.: PCT/EP2019/068487
§ 371 (c)(1),
(2) Date: Jan. 11, 2021

(87) PCT Pub. No.: WO2020/011826
PCT Pub. Date: Jan. 16, 2020

(65) Prior Publication Data
US 2021/0292453 A1    Sep. 23, 2021

(30) Foreign Application Priority Data
Jul. 13, 2018 (DE) .......... 102018211720.9

(51) Int. Cl.
*C08F 220/14* (2006.01)
*C08F 8/00* (2006.01)
(Continued)

(52) U.S. Cl.
CPC .............. *C08F 8/00* (2013.01); *C08F 220/14* (2013.01); *C08G 18/10* (2013.01); *C08G 18/227* (2013.01);
(Continued)

(58) Field of Classification Search
CPC ........ C08F 8/00; C08F 220/281; C08G 18/10; C08G 18/282
See application file for complete search history.

(56) References Cited

U.S. PATENT DOCUMENTS

| 2014/0076768 | A1* | 3/2014 | Skillman ............... B32B 15/095 524/559 |
| 2014/0357783 | A1 | 12/2014 | Mayo et al. |
| 2015/0337147 | A1 | 11/2015 | Mayo et al. |

FOREIGN PATENT DOCUMENTS

| DE | 4104319 A1 | 8/1992 |
| EP | 3296347 A1 | 3/2018 |

(Continued)

OTHER PUBLICATIONS

Becker et al (Macromolecules 2017, 50, 7852-7862). (Year: 2017).*
(Continued)

*Primary Examiner* — Michael M Dollinger
(74) *Attorney, Agent, or Firm* — LOWENSTEIN SANDLER LLP

(57) ABSTRACT

The invention relates to a functionalized polymer to which at least one Diels-Alder adduct is covalently bonded, said Diels-Alder adduct containing a furan and a maleimide component and the furan or the maleimide component having a functional organyl group the molar mass of which is less than 800 g/mol.

13 Claims, 2 Drawing Sheets

(51) Int. Cl.
| | |
|---|---|
| C08G 18/10 | (2006.01) |
| C08G 18/22 | (2006.01) |
| C08G 18/32 | (2006.01) |
| C08G 18/48 | (2006.01) |
| C08G 18/66 | (2006.01) |
| C08G 18/76 | (2006.01) |
| C08G 18/83 | (2006.01) |

(52) U.S. Cl.
CPC ..... *C08G 18/3206* (2013.01); *C08G 18/4825* (2013.01); *C08G 18/6677* (2013.01); *C08G 18/7671* (2013.01); *C08G 18/833* (2013.01)

(56) References Cited

FOREIGN PATENT DOCUMENTS

| | | | |
|---|---|---|---|
| JP | 2008056888 A | * | 3/2008 |
| WO | 2010064274 A1 | | 6/2010 |
| WO | 2017091284 A1 | | 6/2017 |

OTHER PUBLICATIONS

Gousse et al (Macromolecules, vol. 31, No. 2, 1998). (Year: 1998).*
Laita et al (Eur. Polym. J. Vol. 33, No. 8, 1203-121 pp. I, 1997). (Year: 1997).*
Espacenet translation of Takanori (JP 2008056888 A) (Year: 2023).*
B.D. Kaylon et al., "Antibacterial efficacy of triclosan-incorporated polymers", Am. J. Infect. Control., 2001, 29, pp. 124-125 (2 pages).
J.C. Tiller et al., "Amphipilic conetworks as regenerative controlled releasing antimicrobioal coatings" J. Control Release, 2005, 103, pp. 355-367 (13 pages).
J.C. Tiller et al., "Designing surfaces that kill bacteria on contact", Proc. Natl. Acad. Sci. USA, 2001, 98, p. 5981, 5 pages.
J. Lin et al., "Bactericidal Properties of Flat Surfaces and Nanoparticles Derivatized with Alkylated Polyethylenimines" Biotechnolog. Prog., 2002, 18, pp. 1082-1086 (5 pages).
J.-H. Li et al., "Gradient and Weather Resistant Hybrid Super-Hydrophobis Coating Based on Fluorinated Epoxy Resin", J. Appl. Polym. Sci., 2014, 131 (20), p. 40955, 7 pages.
A. Gandini et al., "Reversible click chemistry at the service of macromolecular materials. Part 1: Kietics of the Diels-Alder reaction applied to furan-maleimide model compounds and linear polymerizations", European Polymer J. 2008, 44, pp. 4029-4036 (8 pages).
A. Gandini, "The furan/maleimides Diels-Alder reaction: A versatile click-unclick tool in macromolecular synthesis", Prog. Polym Sci. 2013, 38, pp. 1-29 (29 pages).
J. Kotteritzsch, "One-Component Intrinsic Self-Healing Coatings Based on Reversible Crosslinking by Diels-Alder Cycloadditions," Macromol. Chem. Phys. 2013, 214, pp. 1636-1649 (14 pages).
J. Kotteritzsch et al., "Tuning the self-healing behavior of one-component intrinsic polymers", Polymer 2015, vol. 69, pp. 321-329 (9 pages).
D. H. Turkenburg et al., "Polyurethane adhesives containing Diels-Alder-based thermoreversible bonds", J. Appl. Polymer Sci 2017, 134, p. 44972, 11 pages.
D. H. Turkenburg et al., "Bio-based self-healing coatings based on thermo-reversible Diels-Alder reaction", Prog. Org. Coat. 2017, 111, pp. 38-46, 9 pages.
Yu, Xi; et al. "Self-healing polyurethane nanocomposite films with recoverable surface hydrophobicity", J. Appl. Ploymer Sci 2018, vol. 135, 10 pages.
International Search Report for PCT/EP2019/068487 mailed Oct. 14, 2019, 14 pages.
C.H. Ho et al., "Nanoseparated Polymeric Networks with Multiple Antimicrobial Properties", Adv. Mater., 2004, 16, No. 12, p. 957, 5 pages.

* cited by examiner

FUNCTIONALIZED POLYMERS

CROSS-REFERENCE TO RELATED APPLICATION(S)

This application is a national phase of International Application No. PCT/EP2019/068487, filed on Jul. 10, 2019, which claims the benefit of German Patent Application No. 10 2018 211 720.9, filed on Jul. 13, 2018. The contents of these applications are hereby incorporated by reference in their entirety.

FIELD OF THE INVENTION

The present invention relates to functionalized polymers which comprise covalently bonded Diels-Alder adducts, and to processes for preparing these polymers.

Polymeric materials have specific additives added to them in order to establish physical properties such as flexibility, workability, antimicrobial and biocidal effect, hydrophobicity, hydrophilicity and self-healing, since polymers in their pure form usually do not display the profile of properties that is needed for a specific application. As to the matter of which additives are added, it is dependent on various factors such as polymer type, the planned application or else the prevailing ambient conditions.

The active ingredients are typically admixed to the complete polymer. As a result, the additives are distributed uniformly throughout the polymer. Since, for example, the activity of active biocidal ingredients is dependent on their local concentration, there must also be an appropriate amount of additive added to the polymer. Similar amounts of active ingredients are present both inside the polymer and in the outer boundary layer. However, since the effect is required only at the surface of the polymeric material, the active ingredients inside the polymer are superfluous.

Another drawback of this technique is that the additives added may be released uncontrolledly. Over time, these additives may be washed out, the materials may lose their function, and the additives may enter the environment.

The approach of adding the additive to the completed polymer is described for example by B. D. Kaylon et al., Am, J. Infect, Control, 2001, 29, 124-125; C. J. Ho et al., Adv. Mater., 2004, 16, 957; and J. C. Tiller et al., J. L. Control Release, 2005, 103, 355-367 and in WO 2010/064274 A1.

It is additionally known practice to use specific monomers, when preparing the polymers, that are incorporated directly into the polymer and that provide the corresponding function, Examples thereof include fluorinated polymers or . organosilicones for the generation of hydrophobic or biocidal properties.

The preparation of polymers in which the functional groups are attached covalently to the polymer is described for example by J.C. Tiller et al, Proc. Natl. Acad. Sci. USA, 2001, 98, 5981; J. Lin et al., Biotechnolog. Prog., 2002, 18, 1082-1086 and J.-H. Li et al., J. Appl, Polym. Sci 2014, 131 (20). 40955.

An advantage of this method is that the corresponding active ingredients are incorporated firmly in the polymer. This prevents them being washed out and prevents any associated loss of function. Disadvantages arise in relation to recycling. In order to be able to recycle the polymers, the functional units must be removed; otherwise, there may be instances of cross-contamination. The removal of these functional units is either very costly and inconvenient or completely impossible. Moreover, the synthesis of such polymers may be decidedly expensive. This technique is therefore employed primarily in the medical sector.

Additionally, it is known practice, for the preparation of self-healing polymeric materials, to utilize the reversible Diels-Aider reaction between a furan compound and a cyclic imide compound (e.g., a maleimide compound) in order to carry out reversible crosslinking of polymer chains.

The thermoreversible Diels-Alder reaction known to the skilled person between a furan compound 1 and a maleimide compound 2 to form a Diels-Alder adduct 3 is illustrated by the reaction scheme below:

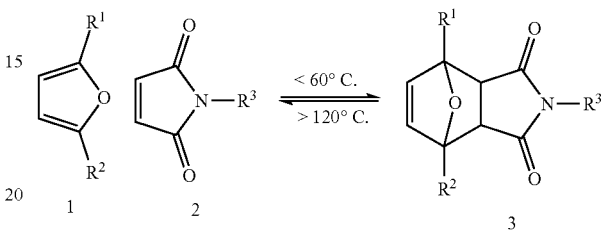

This reaction is an equilibrium reaction, with an equilibrium which can be shifted in a targeted way through temperature control. Below 60 C., the equilibrium lies on the side of the Diels-Alder adduct; above 120° C., it lies on the side of the furan and maleimide compounds.

For the reversible crosslinking of polymer chains, the example, furan-functionalized polymers are crosslinked with bis-, tri- or polymaleimide (i.e., molecules having two, three or multiple maleimide units). In the event of damage (e.g., cracks or fractures in material), these crosslinks are undone by heating, with the polymer chains able to reorder themselves and crosslink again on cooling. This makes it possible to repair damage in the material by bond reordering.

The use of thermoreversible Diels-Alder reactions for preparing self-healing polymer materials is described for example by A. Gandini et al., Eur, Polymer J. 2008, 44, 4029-4036; A. Gandini, Prog. Polym Sci. 2013, 38, 1-29; J. Kötteritzsch, Maeromol, Chem. Phys. 2013, 214, 1636-1649; J. Kötteritzsch et al., Polymer 2015, 69, 321-329; D. H. Turkenburg et. al., J. Appl. Polymer Sci 2017, 134, (26), 44972; and D. H. Turkenburg et al., Prog. Org. Coat. 2017, 111, 38-46; and also in WO 2017/091284 A1 ; US 2015/337147 A1; U.S. 2014/357783 A1 and EP 3296347 A1.

It is an object of the present invention to provide functionalized polymer which can be recycled efficiently, which prevents uncontrolled release of additives, and which as and when required allows selective functionalization only on the surface of the polymeric material,

DETAILED DESCRIPTION

Figure 1:
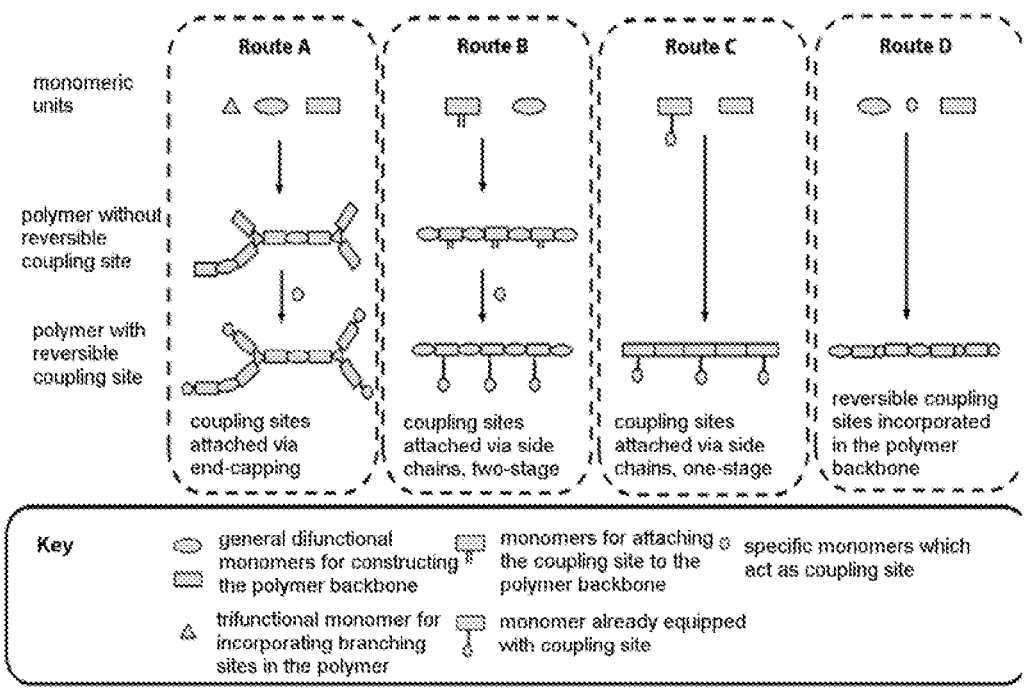
FIG. 1 illustrates synthesis variants for a furan-containing polymer.

The object is achieved by means of a functionalized polymer which comprises at least one covalently bonded Diels-Alder adduct, the Diels-Alder adduct containing a furan component and a cyclic imide component, and the furan component or the cyclic imide component comprising a functional organyl radical whose molar mass is less than 800 g/mol, where the Diels-Alder adduct is bonded covalently via the furan component to the polymer, and the cyclic imide component comprises the functional organyl radical;

or the Diels-Alder adduct is bonded covalently via the cyclic imide component to the polymer, and the furan component comprises the functional organyl radical.

The functional organyl radical in the furan component or the cyclic imide component of Diels-Alder adduct allows the polymer to be provided in a targeted way with a particular function or effect—for example, a biocidal, hydrophobic or hydrophilic effect or an easy-to-clean effect.

Because the Diels-Alder adduct containing the functional organyl radical is bonded covalently to the polymer, any uncontrolled release of additives is prevented. Furthermore, the Diels-Alder adduct can be cleaved thermally as and when required, such as when recycling the polymer, for example. As a result of this controlled cleaving of the Diels-Alder adduct, the component bearing the functional organyl radical (the furan component or the cyclic imide component) can be detached from the polymer. The polymer backbone is retained and continues to comprise a covalently bonded furan or cyclic imide component. Through a Diels-Alder reaction of this remaining component (e.g., the furan component) with the appropriate reaction partner (e.g. a maleimide compound with functional organyl radical), renewed functionalization can be accomplished.

The cyclic imide is, for example, a maleimide or a citraconimide.

As described in more detail below, the functionalized polymer may be prepared by covalently bonding a furan compound, for example (alternatively; a cyclic imide compound) to a starting polymer and then contacting this furan-containing (or imide-containing) polymer with a cyclic imide compound (alternatively: a furan compound) which comprises the functional organyl radical. Via a Diels-Alder reaction, a Diels-Alder adduct is formed which is bonded covalently via its furan component (alternatively; via its cyclic imide component) to the functionalized polymer. If the furan-containing (alternatively: the imide-containing) polymer itself is applied as a coating to a substrate and this coating is contacted with a solution which comprises the cyclic imide compound (alternatively: the furan compound), then the functionalized polymer is formed essentially only on the surface of the coating. This therefore enables selective functionalization only on the surface of the polymeric material.

The functional organyl radical preferably has a molar mass of less than 600 g/mol, more preferably less than 400 g/mol.

The functional organyl radical is preferably in the cyclic imide component of the Diels-Alder adduct. In one preferred embodiment the functional organyl radical is bonded to the imide nitrogen atom of the cyclic imide component.

The functional organyl radical is, for example, a biocidal radical (i.e., a radical deriving from a compound having biocidal properties), a hydrophilic radical or a hydrophobic radical.

The skilled person is familiar with suitable radicals able to provide these effects. The functional organyl radical may comprise, for example, an alkyl group (e.g., a $C_{1-22}$-alkyl group), a quaternary ammonium group (e.g., $[N(C_{1-2}\text{alkyl})_3]^+$), a carboxylic acid or carboxylate group (i.e., —COOH or —COO$^-$), a sulfonamide group (e.g., —SO$_2$—NH-R, where R is $C_{1-4}$-alkyl, more preferably $C_{1-2}$-alkyl, or benzyl), an amine group, a hydroxyl group or a combination of at least two of these groups.

The groups described above may be bonded, for example, via a divalent linker unit or else directly to the nitrogen atom of the imide group in the maleimide component. The divalent linker unit is, for example, —($C_{1-10}$-alkylene)$_a$-(phenylene)$_b$-($C_{1-10}$alkylene)$_c$—, where a is 0 or 1, b is 0 or 1, c is 0 or 1, with the proviso that a+b+c≥1. The $C_{1-10}$-alkylene- and phellylene groups may be substituted or unsubstituted. The $C_{1-10}$-alkylene group may optionally be interrupted by one or more heteroatoms (e.g., an oxygen atom) or at least one functional group (e.g., an ester or amide group).

Where the furan component contains the functional organyl radical, the above-described group may be bonded directly or via a divalent linker unit to the furan component (more precisely: to one of the furan ring carbon atoms of the furan component). The divalent linker unit is, for example, —($C_{1-2}$-alkylene)$_2$-(phenylene)$_b$—($C_{1-10}$-alkylene)$_c$—, where a is 0 or 1, b is 0 or 1, c is 0 or 1, with the proviso that a+b+c≥1. The $C_{1-10}$-alkylene- and phenylene groups may be substituted or unsubstituted. The $C_{1-10}$-alkylene group may optionally be interrupted by one or more heteroatmns (e.g., an oxygen atom) or at least one functional gaup (e.g., an ester or amide group).

The functional organyl radical is, for example, an alkyl (e.g., (e.g., phenyl), an aralkyl or an alkaryl radical, which optionally contains at least one functional group (e.g., an amine group, a quaternary ammonium group, a hydroxyl group, a carboxylic acid or carboxylate group or a sulfonamide group).

If the functional organyl radical is intended to give the polymer a hydrophobic effect or an easy-to-clean effect, the functional organyl radical used may be, for example, a $C_{2-22}$-alkyl radical (i.e., —$C_nH_{2n+1}$, where n=2-22), more preferably a $C_{12-22}$-alkyl radical, more preferably still a $C_{14-18}$-alkyl radical (i.e., —$C_nH_{2n+1}$, where n=12-22, more preferably n=14-18). The alkyl radical may be linear or branched.

If the functional organyl radical is intended to give the polymer a hydrophilic effect, the functional organyl radical used may be, for example. a $C_{1-18}$-alkyl radical, more preferably a $C_{1-7}$-alkyl radical, which contains at least one polar or ionic functional group. Suitable polar or ionic groups stated may be, for example, an amine, ammonium, hydroxyl, carboxylic acid or carboxylate group. The functional organyl radical may be represented, for example, by the following chemical formula:

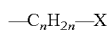
—$C_nH_{2n}$—X where
n is 1-18, more preferably 1-7, and
X is a polar or ionic group, more particularly an amine, ammonium, hydroxyl, carboxylic acid or carboxylate group.

If the functional organyl radical is intended to give the polymer a biocidal effect, the functional organyl radical preferably comprises at least one quaternary ammonium group (e.g., —$[N(C_{1-2}\text{-alkyl})_3]^+$) or at least one sulfonamide group (e.g., —SO$_2$-NH-R, where R is $C_{1-4}$-alkyl, more preferably $C_{1-2}$-alkyd, or benzyl). The functional organyl radical is for example

—$C_nH_{2n}$—$[N(C_{1-2}\text{-alkyl})_3]^+$ where
  n is 1-9, more preferably 1-5.
or —(L)$_m$—SO$_2$-NH-R where
  R is C$_{1-4}$-alkyl, more preferably C$_{1-2}$-alkyl, or benzyl,
  L is a divalent linker unit which has the following formula:

—(C$_{1-10}$-alkylene)$_a$(phenylene)$_b$—(C$_{1-10}$-alkylene)$_c$— where a is 0 or 1, b is 0 or c is 0 or 1, with the proviso that a+b+c≥1, and
  m is 0 or 1.

The C$_{1-10}$alkylene and phenylene groups in the divalent linker unit L may be substituted or unsubstituted. The C$_{1-10}$-alkylene group may optionally be interrupted by one or more heteroatoms (e.g., an oxygen atom) or at least one functional group (e.g., an ester or amide group).

The functionalized polymer to which the Diels-Alder adduct is covalently bonded is, for example, a polyacrylate, a polymethacrylate, a polyester, a polyurethane, a polyurea, a polyamide, a polyesteramide or a polyether.

The Diels-Alder adduct is covalently bonded to the functionalized polymer preferably via the furan component.

The functionalized polymer comprises the covalently bonded Diels-Aider adduct in, for example, the terminal (i.e., end) position. As described in more detail below, it is possible for this purpose, for example, first to prepare a starting polymer which contains reactive groups in terminal position (e.g., an NCO-terminate polyurethane). These terminal reactive groups are subsequently reacted with a foran compound, followed by the reaction of the furan compound bonded terminally to the polymer with a cyclic imide compound containing the functional organyl radical (e.g., a maleimide compound), to give a functionalized polymer having terminally bonded Diels-Alder adducts.

An additional possibility within the context of the present invention is for the covalent bonding of the Diels-Alder adduct to the functionalized polymer to take place via aside chain of the polymer. As described in more detail below, it is possible for this purpose, for example, first to prepare a starting polymer which comprises reactive monomer units (i.e., monomers which even after their incorporation into the polymer still contain reactive groups such as C═C double bonds or functional groups). These reactive, monomer units of the starting polymer are then reacted with a furan compound, followed by the reaction of the furan compound, bonded to the polymer via side chains, with a cyclic imide compound containing the functional organyl radical (e.g., a maleimide compound). Alternatively, it is also possible to use a furan compound as monomer for preparing a starting polymer (optionally together with further monomer compounds) that contains a substituent with a polymerizabie group (e.g., furfuryl(meth)acrylate). In the resultant starting polymer, the furan compound is bonded via side chains to the polymer chain. The furan compound bonded via side chains to the polymer is then reacted with a cyclic imide compound containing the functional organyl radical (e.g., a maleimide compound).

An additional possibility within the context of the present invention is for the Diets-Alder adduct to be incorporated directly into the main polymer chain via the furan component of said adduct. As described in more detail below, it is possible for this purpose, for example, to polymerize a furan compound containing two functional groups (e.g., two hydroxyl groups, such as 2,5-bishydroxymethylfuran) with one or more difunctional compounds (e.g., a diol and/or a dicarboxylic acid).

The Diels-Aider adduct is obtainable via a Diels-Alder reaction of a furan compound and a cyclic imide compound. For example, first a furan-containing polymer which comprises a covalently bonded furan compound is prepared, and subsequently the furan-containing polymer is reacted with a cyclic imide compound which contains the functional organyl radical. Alternatively, it is also possible first to prepare a polymer which comprises a covalently bonded cyclic imide (also referred to hereinafter as imide-containing polymer) and then to react the imide-containing polymer with a furan compound which contains the functional organyi radical.

If the Diels-Alder adduct is bohded covalently via its furan component to the polymer, the furan component present in the Diels-Alder adduct is derived, for example, from a furan compound which has the following formula (I):

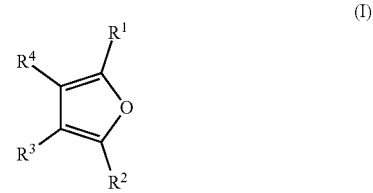

where the radicals $R^1$, $R^2$, $R^3$, and $R^4$, independently of one another, are hydrogen, an alkyl (e.g., a C$_{1-4}$-alkyl), amide, carbonyl, carboxyl, hydroxymethyl, thiomethyl, aldehyde, ester, aminoethyl, vinyl, vinyl ether, allyl, ally ether, an acrylic acid or C$_{1-4}$alkyl acrylate, a methacrylic acid or C$_{1-4}$-alkyl methacrylate or an isocyanatomethyl group, with the proviso that at least one of the radicals $R^1$-$R^4$ is neither hydrogen not alkyl. The aforesaid radicals may optionally be epoxidezed.

For example. $R^3$ and $R^4$, independently of one another, are hydrogen or C$_{1-4}$-alkyl; and $R^1$ and $R^2$, independently of one another, are an amide, carbonyl, carboxyl, hydroxymethyl, thiomethyl, aldehyde, ester, aminoethyl, vinyl, vinyl ether, allyl, allyl ether, acrylic acid or C$_{1-4}$-alkyl acrylate, methacrylic acid or C$_{1-4}$-alkyl methacrylate or isocyanatomethyl group.

Alternatively, it is also possible for $R^2$, $R^3$ and $R^4$, independently of one another, to be hydrogen or C$_{1-4}$-alkyl; and $R^1$ to be an amide, carbonyl, carboxyl hydroxymethyl, thiomethyl, aldehyde, ester, aminoethyl, vinyl, vinyl ether, allyl, allyl ether, acrylic acid or C$_{1-4}$-alkyl acrylate, methacrylic acid or C$_{1-4}$-alkyl methacrylate or isocyanatomethyl group.

Preferred furan compounds of the formula (I) are furfural, furfuryl alcohol, furfuryl amine, furfurylthiol, hydroxymethylfurfural, 2,5-bishydroxymethylfuran, 2,5-bisaminormethylfuran, 2,5-furandicarboxylic acid, 2-carboxy-5-hydroxymethylfuranic acid, furan-2-carboxylic acid, furfuryl acrylate and furfuryl methacrylate. Particularly preferred furan compounds are those without a carbonyl carbon in the alpha position to the furan ring.

These furan compounds are commercially available or may be prepared via synthesis methods of which the skilled person is aware.

Where the Diels-Alder adduct is bonded covalently via its furan component to the polymer, the cyclic imide component present in the Diels-Alder adduct derives preferably from a cyclic imide compound having a functional onganyl radical R⁵, which has the following formula (II):

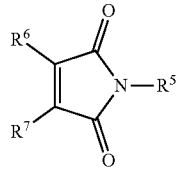
(II)

where
R⁶ and R⁷, independently of one another, are hydrogen or $C_{1-4}$-alkyl; the functional organyl radical $R^5$ comprises an alkyl group (e.g., a $C_{1-22}$-alkyl group), a quaternary ammonium group (e.g., $[N(C_{1-2}\text{-alkyl})_3]^+$), a carboxylic acid or carboxylate group (i.e., —COOH or —COO⁻), a sulfonamide group (e.g., —SO₂—NH—R, where R is $C_{1-4}$-alkyl, more preferably $C_{1-2}$, or benzyl), an amine group, a hydroxyl group or a combination of at least two of these groups.

In one preferred embodiment, $R^6$ and $R^7$ are hydrogen, meaning that cyclic imide compound is a maleimide compound and the Diels-Alder adduct, accordingly, comprises a maleimide component. According to one further preferred embodiment, $R^6$ is hydrogen and $R^7$ is methyl, meaning that the cyclic imide compound is a citraconimide compound and the Diels-Alder adduct, accordingly, comprises a citraconimide component.

The above-stated groups for the functional organyl radical $R^5$ may be bonded via a divalent linker unit or else directly to the nitrogen atom of the imide group. The divalent linker unit is for example

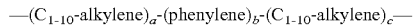

where a is 0 or 1, b is 0 or 1, c is 0 or 1, with the proviso that a+c+c≥1. The $C_{1-4}$-alkylene- and phenylene groups may be substituted or unsubstituted. The $C_{1-10}$-alkylene group may optionally be interrupted by one or more heteroatoms (e.g., an oxygen atom) or at least one functional group (e.g., an ester or amide group).

The functional organyl radical $R^5$ of the cyclic imide compound of the formula (II) is, for example, one of the following radicals;

A $C_{2-22}$-alkyl radical (i.e., —$C_nH_{2n+1}$, where n=2-22), more preferably a $C_{12-22}$-alkyl radical, more preferably still a $C_{14-18}$-alkyl radical (i.e., —$C_nH_{2n+1}$, where n=12-22, more preferably n=14-18), where the alkyl radical may be linear or branched;

a radical of the following chemical formula:

$C_nH_{2n}$-X where
n is 1-18, more preferably 1-7, and
X is a polar or ionic group, more particularly an amine, ammonium, hydroxyl, carboxylic acid or carboxylate group;
a radical of the following chemical formula:

where
n is 1-9, more preferably 1-5;
a radical of the following chemical formula:

where
R is $C_{1-4}$-alkyl, more preferably $C_{1-2}$alkyl, or benzyl,
L is a divalent linker unit which has the following formula:

where a is 0 or 1, b is 0 or 1, c is 0 or 1, with the proviso that a+b+c≥1, and
M is 0 or 1.

The $C_{1-4}$-alkylene- and phenylene groups in the divalent linker unit L may be substituted or unsubstituted, The $C_{1-10}$-alkylene group may optionally be interrupted by one or more heteroatoms (e.g., an oxygen atom) or at least one functional group (e.g., an ester or amide group). Where present, the divalent linker unit L is, for example, a $C_{1-18}$, more preferably a $C_{1-6}$-alkylene group.

These cyclic imide compounds having a functional organyl radical are commercially available or may be prepared by synthesis methods of which the skilled person is aware.

For example, an acid anhydride (e.g., maleic anhydride) is reacted with an amine which comprises the functional organyl radical to give the cyclic imide (method I). Optionally it is also possible for the amine to comprise a precursor of the functional organyl radical and for this precursor to be converted into the functional organyl radical only after the preparation of the cyclic imide. Method I is illustrated in the following reaction scheme:

Method I

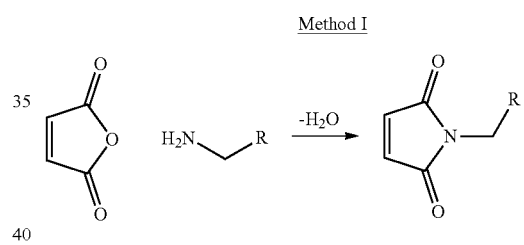

An alternative possibility is to start from a cyclic imide (e.g., maleimide or citraconimide) which has a hydrogen bonded to its imide nitrogen. Through substitution of the hydrogen (e.g., via, a reaction with a halogenated compound), the functional organyl radical is introduced (method II). This is illustrated in the following reaction scheme:

Method II

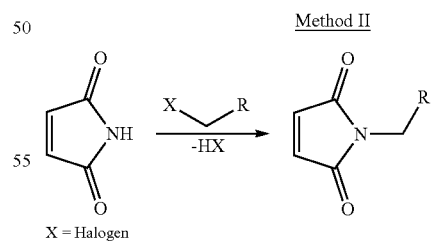

X = Halogen

According to a further variant, for example, first a cyclic imide is prepared which contains a radical halving a reactive coupling site. This radical represents a precursor of the functional organyl radical. In a further step, the reactive coupling site is reacted with a further compound, to give the functional organyl radical. This is illustrated in the following reaction scheme:

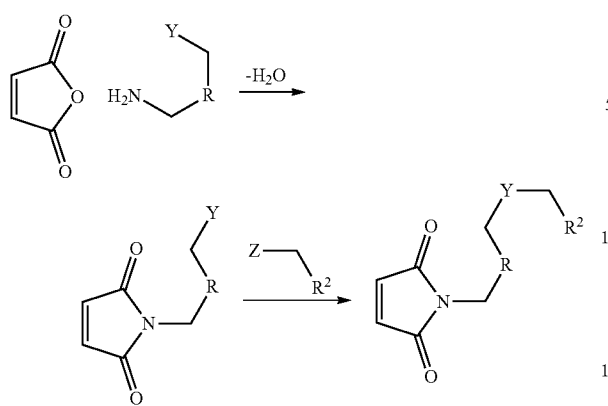

The present invention additionally relates to a process for preparing the above-described functionalized polymer, by
(a1) preparing a furan-containing polymer, which comprises a covalently bonded furan compound,
(a2) reacting the furan compound bonded covalently to the furan-containing polymer, in M Diels-Alder reaction, with a cyclic imide compound which contains a functional organyl radical having as molar mass of less than 800 g/mol or a precursor of this functional organyi radical.

Alternatively, the present invention relates to a process for preparing the above-described functionalized polymer, by
(b1) preparing an imide-containing polymer which comprises a covalently bonded cyclic imide compound,
(b2) reacting the cyclic imide compound bonded covalently to the imide-containing polymer, in a Diels-Alder reaction, with a furan compound which contains a functional organyl radical having a molar mass of less than 800 g/mol or a precursor of this functional organyl radical.

With regard to suitable furan compounds and cyclic imide compounds and to preferred functional organyl radicals, reference may be made to the observations above (e.g., the furan compounds of the formula (I) and the cyclic imide compounds of the formula (II)).

As mentioned above, the functionalized polymer is preferably a polyacrylate, a polymethacrylate, a polyester, a polyurethane, a polyurea, a polyamide, a polyesterarillde or a polyether. Accordingly, the furan-containing polymer in step (a1) or the imide-containing polymer in step (b1) is likewise preferably a polyacrylate, polymethacrylate, a polyester. a polyurethane, a polyarea, a polyamide, a polyesteramide or a polyether.

The incorporation or the attachment of the furan compound into the polymers may take place according to common synthesis methods and is dependent on the chemical nature of the radicals on the furan ring. For example, 2,5-bishydroxymethylfuran, 2,5-bisaminomethylfuran or 2,5-furandicarboxylic acid may be reacted in polycondensations together with other dibasic acids, acid anhydrides, dimethyl esters, diols, diamines or similar compounds, correspondingly, to form polyesters, polyamides, polyesterimides or polyethers. With diisocyanates. the preparation of polyurethanes or polyureas via polyadditions is possible. Furan compounds in which one of the two radicals, $R^1$ or $R^2$, is a H or an alkyl group (e.g., methyl, ethyl or propyl) while the other radical comprises a reactive group, may be attached to the polymers by common methods either via end-capping or as side chains.

The furan-containing polymer is prepared in step (a1), for example, by first reacting a starting polymer which contains reactive groups with a furan compound. Through reaction of the furan compound with the reactive groups of the starting polymer, the furan compound is bonded covalently to the polymer. The reactive groups of the starting polymer may be in terminal position (at the end) and/or distributed in the polymer chain. The reactive group is, for example, an unsaturated bond (e.g. a C=C bond) or a functional group such as isocyanate (—NCO), hydroxyl or carboxyl. Alternatively, the furan-containing polymer may be prepared in step (a1) by using a furan compound as monomer, optionally in combination with further monomers, in the polymerization.

The furan-containing polymer may be prepared in step (a1),for example, by reacting a starting polymer which contains reactive groups (e.g., NCO groups) at the end with a furan compound, so that the furan-containing polymer comprises the covalency bonded furan compound in terminal (i.e., end) position. The starting polymer having terminal reactive groups is, for example, an NCO-terminated polyurethane. This starting polymer may be obtained by reacting one or more OH-containing components (e.g., a polyester polyol, a polyether polyol, a monomeric diol or a triol, or a combination of at least two of these compounds) with one or more diisocyanates, The NCO:OH ratio is for example 1.05-2.0, more preferably 1.5-1.8. The starting polymer having terminal reactive groups may also be a polyester or a polyether.

With regard to suitable furan compounds which can be reacted with the reactive terminal groups of the starting polymer and so bonded covalently in terminal position to the polymer, reference may be made to the observations above (e.g., the furan compounds of the formula (I)). The furan compound is, for example, furfuryl alcohol or furfuryl amine.

Alternatively, the furan-containing polymer may be prepared in step (a1) by reacting a starting polymer which comprises reactive (e.g., unsaturated) monomer units with a furan compound, so that the furan compound is bonded covalently to the polymer by reaction with the reactive monomer units. The furan compound is thereby bonded via side chains to the polymer. With regard to suitable furan compounds, reference may be made to the observations above (e.g., the furan compounds from formula (IO), The starting polymer prepared is, for example, an unsaturated polyester, through reaction, for example, of diols with an unsaturated (preferably nonaromatic) dicarboxylic acid such as fumaric acid, maleic acid, itaconic acid, or a mixture of at least two of these sicarboxylic acids. Optionally here it is possible additionally to use saturated or aromatic dicarboxylic acids. Subsequently, in accordance with the molar fraction of the unsaturated carboxylic acids, a suitable furan compound (e.g., furfuryl amine, furfurylthiol or derivatives thereof) is added, and undergoes a Michael addition reaction onto the polymer.

Alternatively, the furan-containing polymer may be prepared in step (a1) by using a furan compound as monomer for the polymerization, optionally in combination with one or more additional monomer compounds. If a difunctional furan compound such as 2,5-bishydroxymethylfuran, for example, is polymerized together with further di or polyfunctional compounds (e.g., dicarboxylic acids or further diols), the furan compound is incorporated directly into the polymer chain. Alternatively, the furan compound may also be bonded via side chains to the polymer. With regard to suitable furan compounds, reference may be made to the observations above (e.g., the furan compounds of formula (I)), For example, a (meth)acrylated furfuryl alcohol (e.g., furfuryl acrylate or furfuryl methacrylate) is polymerized with one or more other acrylates and/or methacrylates such as butyl acrylate (BA) or methyl methacrylate (MMA) to give poly(meth)acrylates. The polymerization may take place, for example, in the presence of a suitable initiator for a radical polymerization (e.g., azobisisobutyronitrile (AIBN)). The fraction of (meth)arcrylated furfuryl alcohol is 5-100%, preferably 20-50%. The main polymer chain is then constructed via the radical polymerization of the double bonds. The furfuryl units bonded as esters are attached as side chains to the main chain of the polymer. To initiate the radical polymerization it is also possible to employ the widely known methods of ATRP, RAFT or NMRP.

Direct incorporation of the furan compound into the polymer chain is accomplished, for example, if 2,5-bishydroxyethylfuran (BHMF) is reacted with further diols and dibasic acids to give a polyester polyol. The fraction of BHMF is preferably 10-100 mol %, more preferably 30-60 mol %, based on the diol components. The OH:COOH ratio is preferably 1.0-1.9, more preferably 1.1-1.4.

In a further illustrative embodiment, direct incorporation the furan compound into the polymer chain is accomplished when 2,5-bisaminomethylfuron (BAMF) is reacted with further diamines and dibasic acids to give a polyamide. The fraction of BAMF is preferably 10-100 mol %, more preferably 30-60 mol % based on the diamine components. The $NH_2$:COOH ratio is preferably 1.0-1.9, more preferably 1.05-1.2.

FIG. 1 again illustrates the above-described synthesis variants for the containing polymer.

According to route A in FIG. 1, first a starting polymer having terminal reactive groups is prepared, and then the furan compound is bonded covalently to the polymer by reaction with these terminal groups. In FIG. 1, the starting polymer of route A is branched. In the context of the present invention, however, it is also possible to use a linear starting polymer.

According to route B in FIG. 1, a starting polymer which comprises reactive monomer units is prepared (e.g., an unsaturated polyester). Covalent attachment takes place via side chains, through reaction of the furan compound with these reactive monomer units.

According to both route C and mute D, a furan compound is used as a monomer for the polymerization. In route C the furan ring is bonded to the main polymer chain via side chains, whereas in route D the furan compound is incorporated directly into the polymer chain.

The synthesis variants can be used not only for preparing the furan-containing polymer but also for preparing the imide-containing polymer.

As mentioned above, the furan compound bonded covalent to the furan-containing polymer is reacted in step (a2), in a Diels-Alder reaction, with a cyclic imide compound, which contains a functional organyl radical having a molar mass of less than 800 g/mol or a precursor of this functional organyl radical.

With regard to suitable cyclic imide compounds, reference may be made to the observations above (e.g., the cyclic imide compounds of the formula (II)).

Suitable process conditions for Diels-Alder reactions are familiar to the skilled person.

The reaction in step (a2) takes place preferably at a temperature in the range from 40° C. to 80° C.

The reaction in step (a2) may be carried out, for example, in a solution in which the furan-containing polymer and the cyclic imide compound are present in solution.

Figure 2:
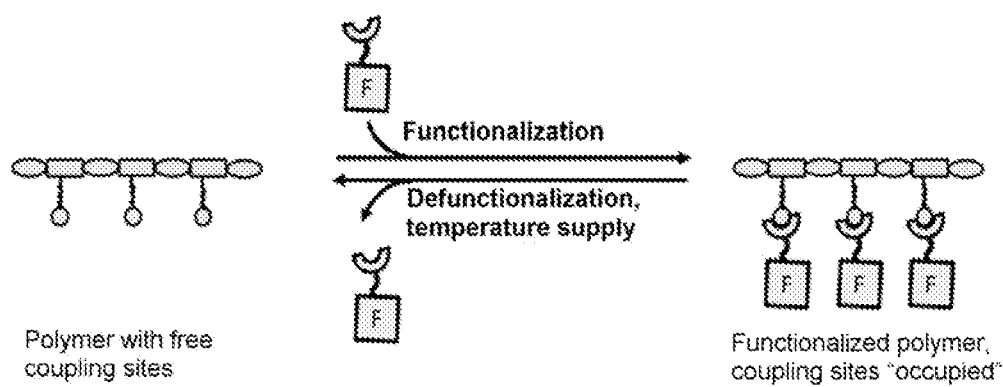
FIG. 2 illustrates the reaction of a furan-containing polymer with a cyclic imide compound which contains a functional organyl radical.

Alternatively, it is also possible for the furan-containing polymer to be used in step (a2) as a solid (e.g., in the form of a coating on a substrate) and for the surface thereof to be contacted (by being sprayed, for example) with a solution which comprises the cyclic imide compound. This makes it possible for the formation of the functionatized polymer to take place essentially only on the surface of the polymeric material, The reaction of the furan-containing polymer with the cyclic imide compound (e.g., a maleimide compound) which contains the functional organyl radical is illustrated in FIG. 2. The left-hand side of the reaction equation shows the furan-containing polymer, with the furan compound being bonded covalently via side chains to the polymer chain ("polymer having free coupling sites"). This polymer is contacted with the cyclic imide compound which carries the functional organyl radical ("F"). The furan compound and the cyciic imide compound are reacted by a Diels-Alder reaction to give a Diels-Alder adduct. The Diels-Alder adducts are bonded covalently via the side chains to the functionalized polymer. At an appropriate increase in temperature, the maleimide compound carrying the functional organyl radical F is cleaved off from the polymer.

If first an imide-containing polymer is prepared (step (b1), then in step (b2) the cyclic imide compound bonded covalently to the imide-containing polymer is reacted in a Diels-.Alder reaction with a furan compound which comprises the functional organyl radical having a molar mass of less than 800 g/mol or a precursor of this functional organyl radical.

Suitable process conditions for Diels-Alder reactions are familiar to the skilled person.

The reaction in step (b2) takes place preferably at a temperature in the range from 40° C. to 80° C.

The reaction in step (b2) may be carried out, for example, in a solution in which the imide-containing polymer and the furan compound are present in solution.

Alternatively, it is also possible for the imide-containing polymer to be used in step (b2) as a solid (e.g., in the form of a coating on a substrate) and for the surface thereof to be contacted (by being sprayed, for example) with a solution which comprises the furan compound. This allows the functionalized polymer to be formed essentially only on the surface of the polymeric material.

Figure 3:
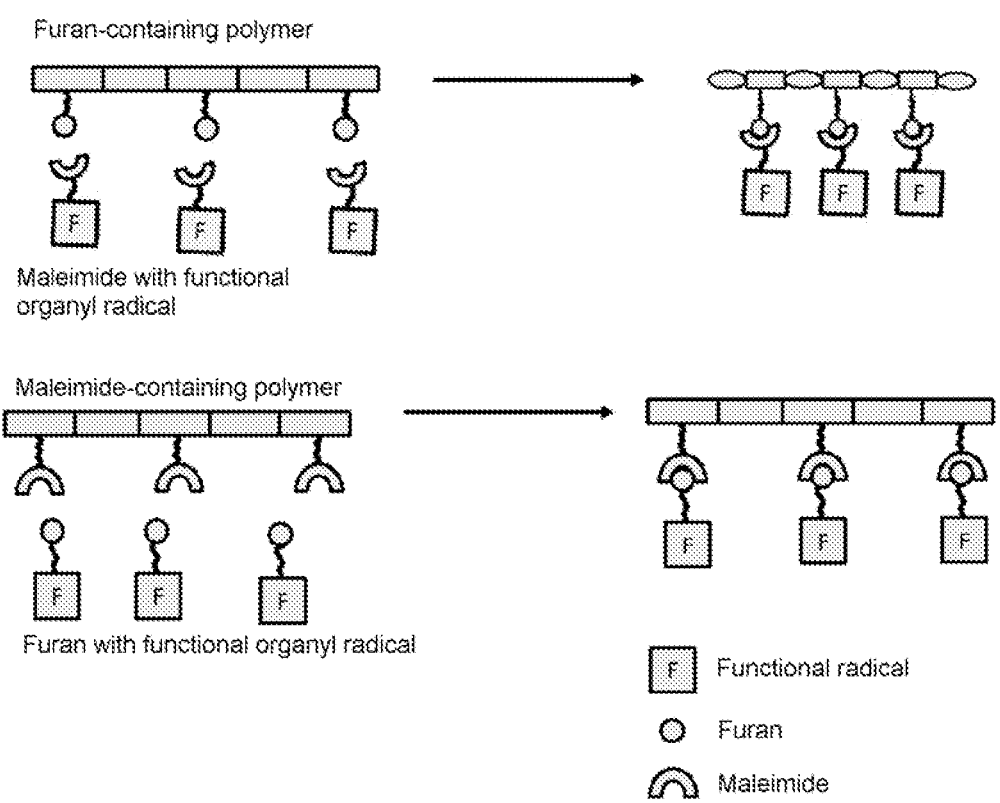
FIG. 3 illustrates the reaction of a furan-containing polymer with a cyclic imide compound which comprises a functional organyl radical, and also the reaction of an imide-containing compound with a furan compound which comprises the functional organyl radical.

The reaction of a furan-containing polymer with a cyclic imide compound which comprises the functional organyl radical, and also the reaction of an imide-containing (e.g., maleimide-containing polymer) with a foran compound which comprises the functional organyl radical are illustrated again in FIG. 3.

The present invention additionally relates to a functionalized polymer which is obtainable by the processes described above.

The present invention additionally relates to a material which compromises the functionatized polymer described above.

The material is, for example, an organosbeet, an adhesive, a coating, a packaging material, a composite material (e.g., a metal-plastic or wood-plastic composite material) or a hybrid component (e.g., a plastic-metal hybrid component).

The present invention additionally relates to the use of the above-described polymer as a biocide.

The invention is described in greater depth with the examples hereinafter.

EXAMPLES

Example 1: Preparation of the Functionalized Polyurethane

The following OH-functional compounds were reacted with the following diisocyanate under the below-specified conditions to form an NCO-terminated polyurethane.

61.78 g of polypropylene glycol 1000, 2.12 g of trimethylolpropane and 36.14 g of methylendiphenyl isocyanate (MDI) were reacted at 95° C. for 2 h. to give an NCO-terminated polyurethane. Catalyst: 0.06 m % Borchikar® 0244.

This initial polymer having terminal NCO groups was reacted with furfuryl alcohol under the following conditions: 100 g of the NCO -terminated starting polymer were admixed with 11.80 g of furfuryl alcohol and the mixture was stirred at 95° C. for a further 2 h.

A furan-containing polymer was obtained, which had the covalently bonded furan compound at the end.

The furan-containing polymer was reacted with the following cyclic imide compound under the conditions stated below:

The furan-containing polymer was reacted at 100° C. in the melt with N-octadecyl maleimide (i.e., a cyclic imide comprising —$C_{18}H_{37}$ as functional organyl radical). The furan:maleimide ratio was 1:0.8.

This gave a functionalized polyurethane which in terminal position had the Diels-Alder adducts.

Example 2: Preparation of the Functionalized Polymethaerylate

Furfuryl methacrylate was polymerized together with the following (meth)acrylates under the conditions described below to give a polymethacrylate:

Methyl methacrylate and furfuryl methacrylate were dissolved in a molar ratio of 70:30 in toluene. 0.1 m % AIBN was added as initiator, and the mixture was stirred at 90° C. for 4 h.

The furan-containing polymethacrylate was reacted with the following cyclic imide compound under the conditions stated below:

The furan-containing polymer was dissolved in toluene and reacted with N-ocetadecyl maleimide (i.e., a cyclic imide which comprises —$C_{18}H_{39}$ as functional organyl radical) at 90° C. The furan:maleimide ratio was 1:0.9.

This gave the functionalized polymethacrylate, with the Diels-Alder adducts being bonded with the polymer chain via side chain.

Through the functional organyl radical in the cyclic imide components of the Diels-Alder adduct, the polymer was able to be provided in a targeted way with a hydrophobic effect. If, for example, a biocidal or hydrophilic organyl radical is used instead of the hydrophobic organyl radical, it is possible to obtain a functionalized polymer having biocidal or hydrophilic properties.

Because the Diels-Alder adduct containing the functional organyl radical is bonded covalently to the polymer, any uncontrolled release of additives is prevented. Moreover, the Diels-Alder adduct may be cleaved thermally as and when required, such as during recycling of the polymer, for example. As a result of this controlled cleaving of the Diels-Alder adduct, it is possible to detach the component carrying the functional organyi radical (the furan component or the cyclic imide component) from the polymer. The polymer backbone is retained and continues to comprise a covalently bonded furan or cyclic imide component. Through a Diels-Aider reaction of this remaining component (e.g., the furan component) with the suitable reaction partner (e.g., a maleimide compound with functional organyl radical), it is possible for further functionalization to be carried out.

The invention claimed is:

1. A functionalized polymer which comprises at least one covalently bonded Diels-Alder adduct, the Diels-Alder adduct containing a furan component and a cyclic imide component, and the furan component or the cyclic imide component comprising a functional organyl radical whose molar mass is less than 800 g/mol, where
   the Diels-Alder adduct is bonded covalently via the furan component to the polymer, and the cyclic imide component comprises the functional organyl radical; or
   the Diels-Alder adduct is bonded covalently via the cyclic imide component to the polymer, and the furan component comprises the functional organyl radical,
   wherein the functional organyl radical comprises an alkyl radical —$C_nH_{2n+1}$, where n=12-22; a quaternary ammonium group or a sulfonamide group.

2. The polymer as claimed in claim 1, wherein the group is bonded directly or via a divalent linker unit to the imide nitrogen atom of the cyclic imide component or to a furan ring carbon atom of the furan component.

3. The polymer as claimed in claim 2, wherein the divalent linker unit has the following structure:
   —($C_{1-10}$-alkylene)$_a$-(phenylene)$_b$-($C_{1-10}$-alkylene)$_c$—
   where a is 0 or 1, b is 0 or 1, c is 0 or 1, with the proviso that a+b+c≥1; and optionally the $C_{1-10}$-alkylene group may be interrupted by one or more heteroatoms or at least one functional group.

4. The polymer as claimed in claim 1, wherein the functional organyl radical is one of the following radicals:
   a radical of the following chemical formula:
   —$C_nH_{2n}$—[N($C_{1-2}$-alkyl)$_3$]$^+$
   where
   n is 1-9;
   a radical of the following chemical formula:
   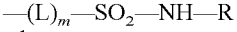
   —(L)$_m$—$SO_2$—NH—R
   where
   R is $C_{1-4}$-alkyl, or benzyl, and
   L is a divalent linker unit.

5. The polymer as claimed in claim 1, wherein the cyclic imide component is a maleimide component or a citraconimide component.

6. The polymer as claimed in claim 1, wherein the Diels-Alder adduct is bonded in terminal position of the polymer and/or by side chains to the polymer or is incorporated via its furan component directly in the polymer chain.

7. The polymer as claimed in claim 1, wherein the polymer is polyacrylate, polymethacrylate, polyester, polyurethane, a polyurea, a polyamide, a polyesteramide or a polyether.

8. A process for preparing the functionalized polymer as claimed in claim 1, by
   (a1) preparing a furan-containing polymer, which comprises a covalently bonded furan compound,
   (a2) reacting the furan compound bonded covalently to the furan-containing polymer, in a Diels-Alder reaction, with a cyclic imide compound which contains a functional organyl radical having a molar mass of less than 800 g/mol or a precursor of this functional organyl radical,
   wherein the functional organyl radical comprises an alkyl radical —$C_nH_{2n+1}$ where n=12-22; a quaternary ammonium group or a sulfonamide group.

9. The process as claimed in claim 8, wherein the furan-containing polymer is prepared in step (a1) by reacting a starting polymer which contains reactive groups with a furan compound; or the furan-containing polymer is obtained in step (a1) by a polymerization using a furan compound as monomer.

10. A process for preparing the functionalized polymer as claimed in claim 1, by
(b1) preparing an imide-containing polymer which comprises a covalently bonded cyclic imide compound,
   (b2) reacting the cyclic imide compound bonded covalently to the imide-containing polymer, in a Diels-Alder reaction, with a furan compound which contains a functional organyl radical having a molar mass of less than 800 g/mol or a precursor of this functional organyl radical, wherein the functional organyl radical comprises an alkyl radical —$C_nH_{2n+1}$, where n=12-22; a quaternary ammonium group or a sulfonamide group.

11. The process as claimed in claim 10, wherein the imide-containing polymer is prepared in step (b1) by reacting a starting polymer containing reactive groups with a cyclic imide compound.

12. The process as claimed in claim 8, wherein the cyclic imide compound is a compound of the following formula (II):

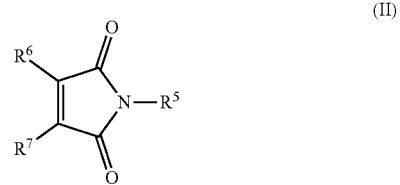

where
$R^6$ and $R^7$, independently of one another, are hydrogen or $C_{1-4}$-alkyl;
$R^5$ is the functional organyl radical.

13. The process as claimed in claim 8, wherein the furan compound has the following formula (I):

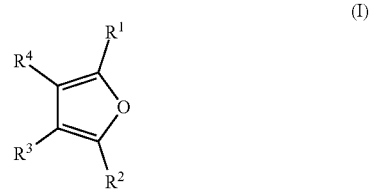

where the radicals $R^2$, $R^3$ and $R^4$, independently of one another, are hydrogen, an alkyl, amide, carbonyl, carboxyl, hydroxymethyl, thiomethyl, aldehyde, ester, aminoethyl, vinyl, vinyl ether, allyl, allyl ether, thiomethyl, acrylic acid or $C_{1-4}$-alkyl acrylate, methacrylic acid or $C_{1-4}$-alkyl methacrylate or isocyanatomethyl group, with the proviso that at least one of the radicals $R^1$-$R^4$ is neither hydrogen nor alkyl.

\* \* \* \* \*